July 30, 1968  W. R. KINCHELOE ET AL  3,395,346
PHASE AND INSTANTANEOUS FREQUENCY DISCRIMINATOR
Filed March 24, 1965  2 Sheets-Sheet 1

INVENTORS
WILLIAM R. KINCHELOE
MARK W. WILKENS
BY Samuel Lindenberg
ATTORNEY

INVENTORS
WILLIAM R. KINCHELOE
MARK W. WILKENS
BY Samuel Lindenberg
ATTORNEY

United States Patent Office 3,395,346
Patented July 30, 1968

3,395,346
PHASE AND INSTANTANEOUS FREQUENCY DISCRIMINATOR
William R. Kincheloe and Mark W. Wilkens, Palo Alto, Calif., assignors to Research Corporation, New York, N.Y., a non-profit corporation of New York
Filed Mar. 24, 1965, Ser. No. 446,771
11 Claims. (Cl. 324—88)

ABSTRACT OF THE DISCLOSURE

An arrangement for determining the relative phase or instantaneous frequency of two signals is provided. The signals are divided into components having equal magnitude and one of these components is arranged to have phase shifts which are fixed relative to the other set of components. All of these components are combined in a plurality of summing networks the outputs of which are applied to square law detectors. The square law detector outputs are then combined by subtraction circuits to provide a sine function and a cosine function which can thereafter be applied to an indicator such as a cathode ray device to indicate phase and/or frequency of the input signals.

---

This invention relates to phase and frequency discriminators and more particularly to improvements therein.

An object of this invention is to provide apparatus for enabling an accurate determination of the relative phase and/or the frequency of a signal applied to the apparatus.

Another object of the invention is the provision of a simple and useful structure for measuring the instantaneous frequency, as well as frequency variations of an input signal.

Yet another object of this invention is to provide a novel circuit arrangement which can be employed for determining characteristics of other circuits.

Still another object of the present invention is the provision of a frequency discriminator device which involves no critical components or active components and is relatively insensitive to wide ranges of temperature, humidity and shock conditions.

These and other objects of the present invention are achieved in an arrangement wherein two input signals are each divided into four components with equal magnitude and with one set of four components arranged to have fixed relative phase shifts of zero, 90°, 180° and 270° with respect to the other set of four components. The respective phase shifted components are in turn delivered to four summing networks, each of which adds two of these components. The four sums are respectively applied to four square law detectors. These detector voltages corresponding to signal components having zero degrees and 180° relative phase are subtracted to give a cosine function of the differential phase angle of the input signals and these detected voltages corresponding to plus 90° and minus 90° (or plus 270°) relative phase are subtracted to give a sine function of the difference phase angle of the input signals. The sine and cosine function output signals may be used to indicate phase and/or frequency of the input signals. In one method of so indicating, the sine and cosine components are applied to the respective X and Y deflection electrodes of a cathode ray tube oscilloscope. If the product of the input signal amplitudes are constant, the spot of light on the cathode ray tube face moves in a circular path about the zero point as its center as the frequency is varied. Under constant amplitude and constant frequency input conditions, the light spot is stationary and establishes a vector, whose angle with respect to the X axis indicates the relative phase or instantaneous frequency of the two applied signals.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
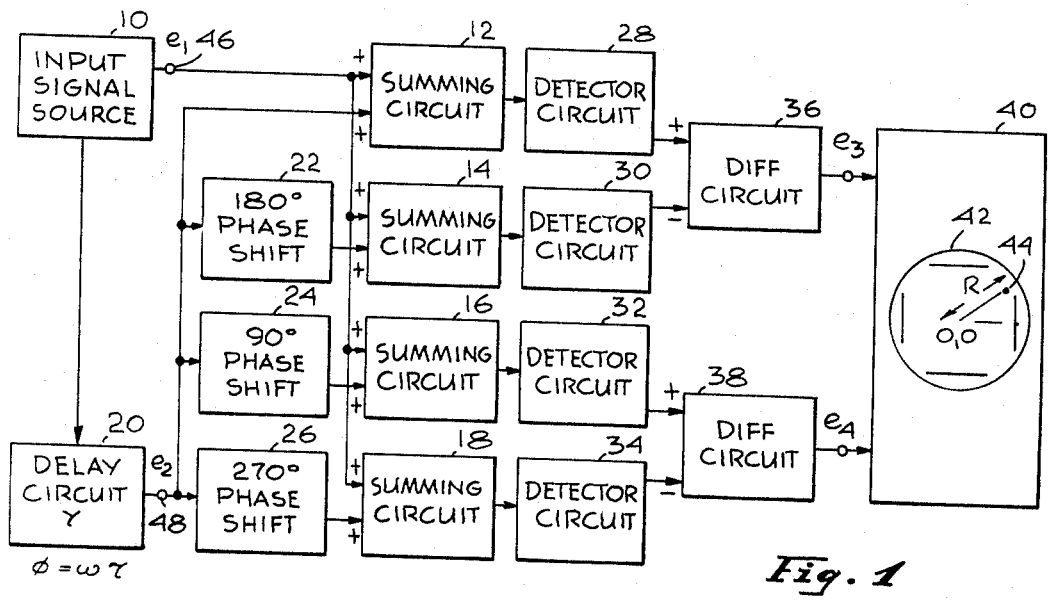
FIGURE 1 is a block schematic diagram of an embodiment of the invention.

Referring now to FIGURE 1, there may be seen a block schematic diagram of an embodiment of the invention used as a frequency detector. Signals from an input signal source 10 are first divided into two components. One of these two components is applied directly as one input to each one of the summing circuits respectively 12, 14, 16, 18. The other component is applied to a delay circuit 20. The delay circuit provides a fixed and known delay $\tau$ to the signal applied thereto. The output of the delay circuit 20 is applied as a second input to the summing circuit 12 and is also applied as an input to the respective phase shift circuits respectively 22, 24, 26. These phase shift circuits 22, 24 and 26 repectively provide a phase shift of 180°, 90°, 270° or minus 90° to the input signal received from the delay circuit 20. The phase shifts can be obtained in a variety of known ways, as long as the correct relative angles are preserved.

The output of the phase shift circuits 22, 24 and 26 are respectively applied to the summing circuits 14, 16 and 18. The summing circuits add the signals applied to their inputs. These circuits can constitute any of the well-known circuit arrangements for performing this logical function. The outputs of the respective summing circuits, 12, 14, 16 and 18 are applied to the respective square law detector circuits 28, 30, 32 and 34. These are square law devices and detect the envelopes of their respective inputs.

The outputs of detector circuits 28 and 30, which correspond to the zero and 180° relative phase signals are applied to a difference or subtraction circuit 36 to be subtracted. The output signal is a cosine function of the difference phase angle of the input signals as the output. The output of the detector circuits 32 and 34 corresponding to the plus 90° and minus 90° relative phase inputs are also applied to a difference circuit 38, whose output is a sine function of the difference phase angle of the input signals. These difference or subtraction circuits are also well known logical circuit arrangements and thus their details need not be provided.

The output voltages of the difference circuits 36 and 38 may be applied to utilization apparatus, such as a display apparatus 40, which constitutes a cathode ray oscilloscope. The respective difference circuits' outputs are applied to the vertical and horizontal deflector inputs of the oscilloscope and a Lissajous type of display is obtained on the tube face 42. For a typical signal the display consists of a single vector of length R, determined by the signal amplitude, at an angle $\theta$, determined by the frequency of the signal. Thus, the display indicates the instantaneous signal frequency as distinguished from the spectrum frequency. A constant amplitude input signal will cause the display spot 44 to move in a circular path about the zero point as a center as the frequency is varied. When a constant amplitude and constant frequency input signal is received from the source 10, the spot 44 remains stationary and determines the vector R whose angle with respect to the X axis constitutes the frequency read out.

As described thus far, the apparatus affords a determination of the frequency of the input signal received from the source 10. It should be appreciated that the apparatus can serve as a phase discriminator between two similar frequency signals which however, do not have the same phase. The angle $\theta$ made by the spot 44 with the origin zero zero in FIGURE 1 is directly proportional to the relative phase of the input signals. If instead of a cathode ray tube display device, a device for providing the ratio of two input voltages is used, then the output of the device is a function of the phase (or instantaneous frequency), only, and is independent of the amplitude of the input signals, or of amplitude modulation.

The foregoing may perhaps be seen more clearly from the following. Assume that a signal $e_1$ is applied to input terminal 46 such that $e_1 = a_1(t) \cos \theta_1(t)$. Assume that a signal $e_2$ is applied to input terminal 48 such that $e_2 = a_2(t) \cos \theta_2(t)$. The output from the difference circuit 36 is $a_1 a_2 \cos (\theta_1 - \theta_2)$ and the output of the difference circuit 38 is $a_1 a_2 \sin (\theta_1 - \theta_2)$.

It will be appreciated that when the two outputs of the difference circuits are divided, as by a voltage divider, the amplitude terms $a_1 a_2$ cancel and one is left with a single signal which is tan $(\theta_1 - \theta_2)$. Thus, it can be seen that in principle the output of this apparatus is not dependent upon the amplitude of the input signals. It should further be appreciated that where the invention is used in the form shown in FIGURE 1, wherein the single input signal source has a delay applied thereto in one path, then the angle $\theta_2 = 2\pi f \tau a_1$ or $\omega \tau$.

Figure 2:
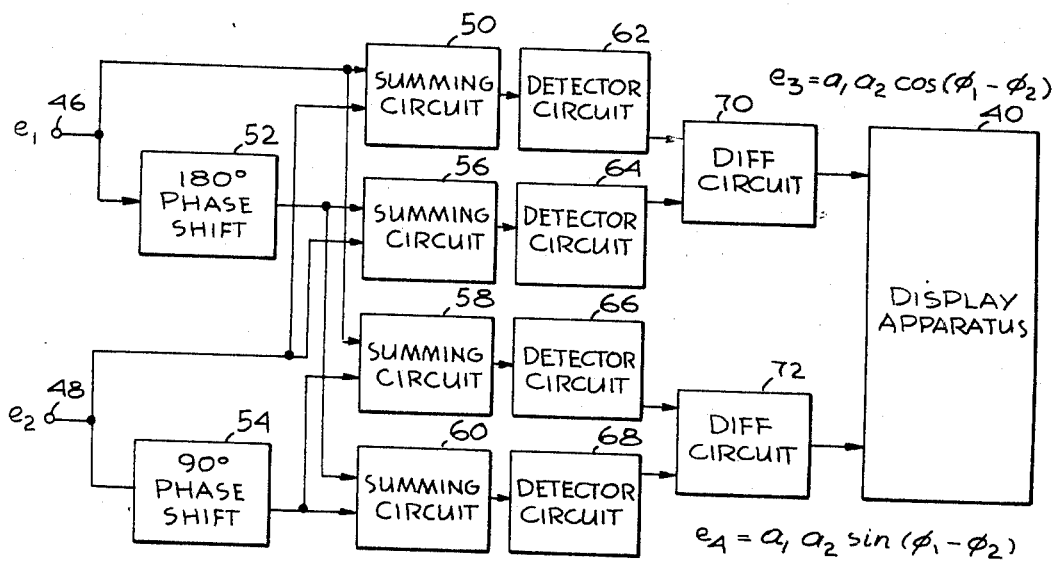
FIGURE 2 is a block schematic diagram illustrating a second embodiment of the invention.

The phase shifts shown in FIGURE 1 may be obtained in either channel in a variety of ways as long as the correct relative angles are preserved. FIGURE 2 is a block schematic diagram of another arrangement for accomplishing these phase delays. A signal $e_1$ is applied to the input terminal 46, which corresponds to the input terminal 46 in FIGURE 1. The signal, which is applied to input terminal 46, is thereafter connected to a summing circuit 50, a summing circuit 58, and to a 90° phase shift network 52. The output of the 90° phase shift network is applied to a summing circuit 56, and to a summing circuit 60. A signal $e_2$ which is applied to input terminal 48, is also applied to the summing circuit 50, the summing circuit 56, and to the 180° phase shift circuit 54. The output of the 180° phase shift 54 is applied to the summing circuit 58 and to the summing circuit 60.

The summing circuit 50 directly adds the two input signals and applied the sum to a square law detector circuit 62. The summing circuit 56 adds $e_2$ and $e_1$ shifted 180° and applies this sum to the square law detector circuit 64. The summing circuit 58 adds $e_1$ and $e_2$ shifted 90° and applies this sum to a detector circuit 66. The summing circuit 60 adds the $e_1$ shifted 180° and $e_2$ shifted 90° and applies this sum to a square law detector circuit 68. The output of the detector circuits 62 and 64 are applied to a difference circuit 70, the output of which comprises a signal, $a_1 a_2 \cos (\theta_1 - \theta_2)$. The output of detector circuits 66 and 68 are subtracted from one another by employing a difference circuit 72. The output of the differencing circuit, as before, comprises $a_1 a_2 \sin (\theta_1 - \theta_2)$. The outputs of the two differencing circuits may be applied to display apparatus or other utilization equipment as desired for indicating a phase difference or a frequency.

Figure 3:
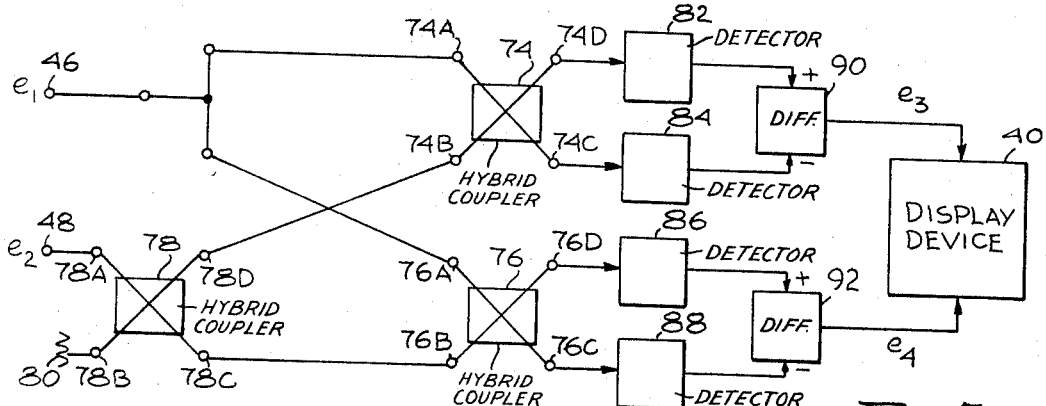
FIGURE 3 is a block schematic diagram illustrating the use of hybrid couplers in the invention.

FIGURE 3 shows how the phase discriminator, in accordance with this invention, may be achieved with hybrid couplers, for use at high frequencies. The signal $e_1$ which is applied to input terminal 46 is then applied to the respective input terminals 74A and 76A of hybrid couplers 74 and 76. The input signal $e_2$ which is applied to input terminal 48 thereafter is applied to the input terminal 78A of hybrid coupler 78. These hybrid couplers 74, 76 and 78 are well known structures in the high frequency art. They operate so that an input on any one of the terminals designated by an A appears equally, but with half input power on the terminals designated with a C and with a D, but the output of the D terminal is shifted 90° relative to the input on the C terminal. Similarly, an input to any one of the terminals designated with C and D with half input power, but the output on the C terminal is shifted 90° in phase with respect to the output on the D terminal. The resistor 80 shown as being connected to the terminal 78B will be recognized as representing an absorbing termination.

The output on terminal 78D of hybrid coupler 78 is applied as an input to terminal 74B of hybrid coupler 74. The output on terminal 78C of hybrid coupler 78 is applied to the terminal 76B of hybrid coupler 76. Therefore, on terminal 74D of hybrid coupler 74 there appears the sum of $e_1$ shifted 90° and $e_2$ shifted 90°. On terminal 74C there appears the sum of $e_1$ and $e_2$ shifted 180°.

Terminals 74D, 74C, 76D and 76C are respectively connected to the respective square law detector circuits 82, 84, 86 and 88. The outputs of detectors 82 and 84 are subtracted by the differencing circuit 90, the outputs of detectors 86 and 88 are subtracted from one another by the differencing circuit 92. The outputs of the differencing circuits can then be applied to a display device 40.

Figure 4:
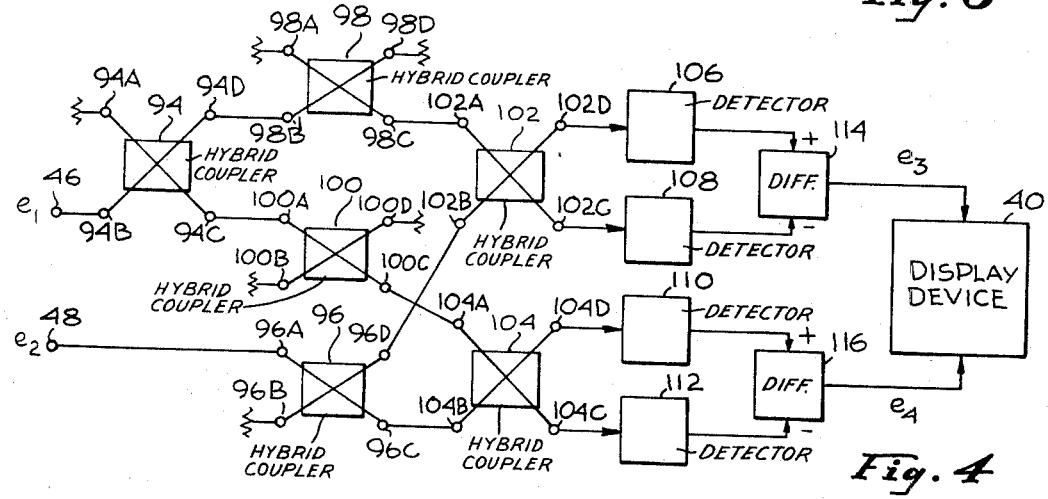
FIGURE 4 is a block schematic diagram illustrating a preferred wide band hybrid coupler arrangement of the invention.
Figure 5:
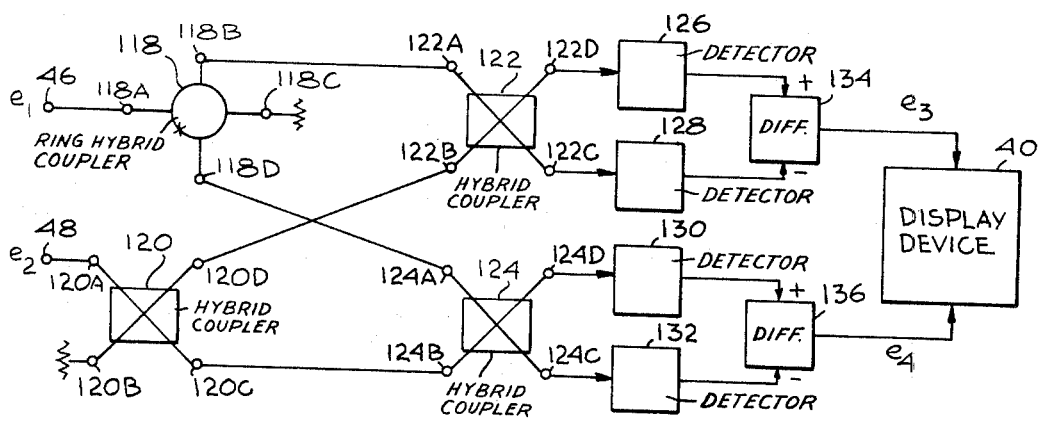
FIGURE 5 illustrates how a ring hybrid coupler may be employed with this invention.

For extremely wide band applications an all hybrid coupling arrangement, such as shown in FIGURE 4 may be employed. The signal $e_1$ is applied to input terminal 46 which is connected to terminal 94B of the hybrid coupler 94. The $e_1$ signal has its power divided by the coupler 94 and at terminal 94D a signal $e_1$ appears and at terminal 94c a signal $e_1$ at 90° phase shift. The $e_2$ signal which is applied to input terminal 48 is divided by hybrid coupler 96 whereby the signal $e_2$ appears on terminal 96C and $e_2$ shifted by 90° appears at terminal 96D. Terminal 94D is connected to the terminal 98B of hybrid coupler 98. Thus, at terminal 98C of this coupler there appears a signal $e_1$ shifted by 90°. Terminal 94C is connected to the terminal 100A of hybrid coupler 100. Thus, the signal at the terminal 100C comprises $e_1$ shifted 90° as before, but with half the input power. Hybrid coupler 100 is inserted in the circuit to equalize power levels. Terminal 96C is connected to terminal 102A of hybrid coupler 102. Terminal 96D is connected to terminal 102B of hybrid coupler 102. Accordingly, on terminal 102D there will appear the sum of $e_1$ with 180° phase shift and $e_2$ with 90° phase shift. On terminal 102C there will appear the sum of $e_1$ with 90° phase shift and $e_2$ with 180° phase shift.

Terminal 100C is connected to terminal 104A of hybrid coupler 104. Terminal 96C is connected to terminal 104B of hybrid coupler 104. Accordingly, at terminal 104D there appears the sum of $e_1$ with 180° phase shift and $e_2$. At terminal 104C there appears the sum of $e_1$ with 90° phase shift and $e_2$ with 90° phase shift.

Terminals 102D and 102C are respectively applied to square law detector circuits 106 and 108. Terminals 104D and 104C are applied to the respective square law detector circuits 110 and 112. Differencing circuit 114 subtracts the outputs of the detectors 106 and 108. Differencing circuit 116 subtracts the outputs of square law detector circuits 110 and 112. The outputs from the differencing circuit may be applied to a display device 40.

FIGURE 3 shows how the phase discriminator in accordance with this invention may be realized employing ring and coupler hybrids. The signal $e_1$ is applied to input terminal 46 from whence it is connected to a terminal 118A of a ring hybrid coupler 118. The ring hybrid coupler is a well-known structure which has the property that an input signal to one of its terminals 118A appears at the other terminals 118B and 118D with a 180° relative phase shift. Further, the power is equally divided between terminals 118B and 118D, with terminal 118C isolated. Accordingly, the signal $e_1$ which is applied to input terminal 118A appears at output terminal 118B with a 180° phase shift relative to the signal of equal magnitude which appears at terminal 118D.

Terminal 48 has input signal $e_2$ applied thereto. Terminal 48 is connected to terminal 120A of hybrid coupler 120. Terminal 118B of hybrid coupler 118 is connected to the terminal 122A of hybrid coupler 122. Terminal 120D of hybrid coupler 120 is connected to terminal 122B of hybrid coupler 122. Terminal 118D of ring hybrid coupler 118 is connected to terminal 124A of hybrid coupler 124. Terminal 120C of hybrid coupler 120 is connected to terminal 124B of hybrid coupler 124. Thus, there is applied to the square law detector 126 from terminal 122D the sum of $e_2$ shifted 90° and $e_1$ shifted 270°. There is applied to square law detector 128 the sum of $e_1$ shifted 180° and $e_2$ shifted 180°. There is applied to square law detector 130 from terminal 124D the sum of $e_1$ shifted 90° and $e_2$. There is applied to square law detector 132 the sum of $e_1$ and $e_2$ shifted 90°.

The outputs from the two square law detectors 126 and 128 are applied to a differencing circuit 134 and the outputs of the square law detectors 130 and 132 are applied to a differencing circuit 136. The outputs of the differencing circuits are applied to a display device 40.

From the foregoing, it will be seen that the basic concept of the phase discriminator of the present invention is to divide each of two input signals into four components, shifting the phases of the components in multiples of 90° so that the four possible combinations are obtained. These are then added and passed through a square law device, such as an envelope detector. The detected voltages are subtracted to give a cosine function of the differential phase angle of the input signal and a sine function of the differential phase angle of the input signal. The two input signals may be relatively phase displaced whereby the relative phase may be detected and displayed, or an input signal may be divided into two paths having unequal path lengths due to a transmission delay whereby the phase discriminator may be employed to display a phase angle which is a linear function of the input signal frequency.

Figure 6:
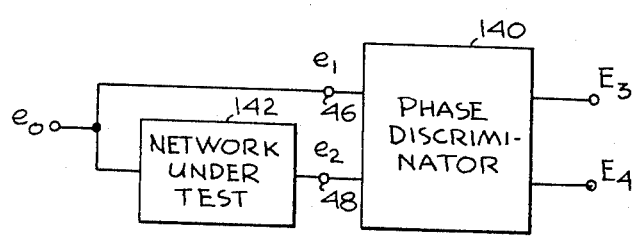
FIGURE 6 illustrates how the invention may be used as a network characteristic determining device.

FIGURE 6 is a schematic representation illustrating the general utility of the present invention. In view of the fact that the phase discriminator network 140, representing any of the arrangements shown in the preceding figures of the drawings commencing with input terminals 46 and 48, has the property of providing separable phase and amplitude measurements, then, by using a known reference signal $e_0$ and applying it to the phase discriminator input as the signal $e_1$ and to a network under test 142 whose output is the input signal $e_2$, the characteristic of the network may be measured. For example, if the network under test is a transmission device, then a simultaneous output may be obtained of the phase and amplitude functions of the transmission device. Similarly, if the network under test is a modulator, then, the output can provide information as to the amplitude and phase modulation characteristics of the modulator. The delay characteristics of different delay networks may be determined by connecting them in the location of the network under test.

Further, if a circulator is inserted in the location of the network under test 142, and an unknown impedance is connected to the circulator, the reflection from the unknown impedance then appears as the second input to the phase discriminator circuit with the other input being the known signal. An output from the circulator may be used for $e_1$ to which there is connected a reference impedance so that the reference signal of known phase and magnitude may be applied to the terminal 46 of the phase discriminator. The phase and amplitude of the unknown impedance can be determined from the separable and/or simultaneous determination of relative phase and magnitude at the output of the phase discriminator.

The foregoing is only exemplary and not to be construed as a limitation upon the utility of the subject invention. Accordingly, there has been described a phase discriminator circuit which has the property that in response to two input signals, there are provided sine and cosine output signals from which there may be derived information indicative of the relative phase angle or frequency of the signals that are applied to the inputs.

What is claimed is:

1. Apparatus for indicating an electrical relationship between a first and a second input signal comprising a first, second, third, and fourth summing circuit each having two inputs and one output, means for separately applying said first and second signals to each of the respective two inputs of said first, second, third, and fourth summing circuits with one of said first and second signals differing in phase from another by a multiple of 90°, a first, second, third, and fourth square law detector circuit, means for connecting the output of each said respective first, second, third, and fourth summing circuits to said first, second, third and fourth square law detector circuits, first means for subtracting the outputs from said first and second square law detector circuits from one another, second means for subtracting the outputs of said third and fourth square law detector circuits from one another, and means for utilizing the outputs of said first and second means for subtracting for indicating the electrical relationship of said first and second signals.

2. Apparatus for indicating a property of relationship between a first signal relative to a second signal comprising means for generating said first and second signal, first, second, third, and fourth summing circuits, first means for applying said first signal to said first, second, third, and fourth summing circuits, second means for applying said second signal to said first, second, third, and fourth summing circuits, at least one of said first and second means for applying signals including phase shift means for shifting phase of signals applied to said summing circuits by multiples of 90° for providing as an input to each summing circuit a first and second signal whose phases are different by multiples of 90° from the first and second signal inputs applied to the other summing circuits, a first, second, third, and fourth square law detecting circuit to which the outputs of said first, second, third, and fourth summing circuits are applied, first means for subtracting the output of said first square law detecting circuit from the output of said second square law detecting circuit, second means for subtracting the output of said third square law detecting circuit from the output of said fourth square law detecting circuit, and means for utilizing the outputs of said first and second means for indicating said first signal property relative to said second signal.

3. Apparatus as recited in claim 1 wherein said means for generating said first and second signals comprises a source of signals, means for applying signals from said source of signals to said first means for applying said first signal to said first, second, third, and fourth summing circuits, network means, and means connecting said network means between said source of signals and said second means for applying said first signal to said first, second, third, and fourth summing circuits.

4. Apparatus as recited in claim 3 wherein said network means comprises a delay circuit.

5. Apparatus as recited in claim 3 wherein said network means comprises a modulator and means for applying a third signal to be modulated on signals from said source of signals thereto.

6. Apparatus as recited in claim 3 wherein said network means includes a circulator connected between said source of signals and said second means for applying signals to said first, second, third, and fourth summing circuits, and a test network connected to said circulator.

7. Apparatus for determining a relative property of a first and second signal comprising a first, second, third, and fourth summing circuit, a first input terminal, a second input terminal, means for respectively applying said first and second signals to said first and second input terminals, a first, second, third, and fourth summing circuit each having two inputs, means connecting said first input terminal to one of the two inputs of said four summing circuits, means connecting said second input terminal to the second input of said first summing circuit, a 180° phase shift network having its input connected to said second input terminal and its output connected to the second input of said second summing network, a 90° phase shift network having its input connected to said second input terminal and its output connected to the second input of said third summing circuit, a 270° phase shift network having its input connected to said second input terminal and its output connected to said fourth summing circuit, first, second, third, and fourth square law detector circuits, means connecting the respective outputs of said first, second, third, and fourth summming circuits to the respective inputs of said first, second, third, and fourth square law detector circuits, first means for subtracting the output of said first detector circuits from the output of said second detector circuit, second means for subtracting the output of said third detector circuit from the output of said fourth detector circuit, and means for utilizing the outputs of said first and second means for subtracting for indicating said relative property of said first and second signals.

8. A network for determining the relative properties of a first and a second signal comprising a first and a second input terminal to which said first and second signals are respectively applied, a first, second, third, and fourth summing circuit each of which has a first and second input and an output, means connecting said first input terminal to the first input of said first and third summing circuits, means connecting said second input terminal to the second input of said first and second summing circuits, a 90° phase shift network having its input connected to said first input terminal and its output connected to the first input of said second summing circuit and the first input of said fourth summing circuit, a 180° phase shift network having its input connected to said second input terminal and its output connected to the second input of said third summing circuit and the second input of said fourth summing circuit, a first, second, third, and fourth square law detector circuit, means connecting the outputs of said first, second, third, and fourth summing circuits to the respective inputs of said first, second, third, and fourth square law detector circuits, first means for subtracting the output of said first detector circuit from the output of said second detector circuit, second means for subtracting the output of said third detector circuit from the output of said fourth detector circuit, and means for utilizing the outputs of said first and second means for subtracting for indicating the desired relative properties of said first and second input signals.

9. A network for determining the relative properties of a first and a second signal comprising a first and a second input terminal to which said respective first and second signals are applied, first, second, and third hybrid couplers, each of said hybrid couplers having first and second input terminals, third and fourth output terminals, and means intercoupling said input and output terminals for providing responsive to a signal applied to said first terminal an output signal on each of said third and fourth terminals having one-half of the power of said signal applied to said first terminal with said signal on said third terminal being shifted 90° in phase relative to the signal on said fourth terminal and responsive to a signal applied to said second terminal an output signal on each of said third and fourth terminals having half the power of said signal applied to said second terminal with the signal on said fourth terminal being shifted 90° in phase relative to the signal on said third terminal, means for connecting said first input terminal to the first terminal of said first and second hybrid coupler, means connecting the second input terminal to the first terminal of said second hybrid coupler, an absorption load connected to the second terminal of said third hybrid coupler, means connecting the third terminal of said third hybrid coupler to the second terminal of said first hybrid coupler, means connecting the fourth terminal of said third hybrid coupler to the second terminal of said second hybrid coupler, first, second, third, and fourth square law detector circuits, means connecting the third terminal of said first hybrid coupler to said first square law detector circuit, means connecting the fourth terminal of said first hybrid coupler to said second square law detector circuit, means connecting the third terminal of said second hybrid coupler to said third square law detector circuit, means connecting the fourth terminal of said second hybrid coupler to said fourth square law detector circuit, first means for subtracting the output of said first square law detector circuit from the output of said second square law detector circuit, second means for subtracting the output of said third square law detector circuit from said fourth square law detector circuit output, and means for utilizing the outputs of said first and second means for subtracting for indicating the desired relative properties.

10. A network for determining the relative properties of a first and a second signal comprising a first and a second input terminal to which said respective first and second signals are applied, first, second, and third hybrid couplers, each of said hybrid couplers having first and second input terminals, third and fourth output terminals, and means intercoupling said input and output terminals for providing responsive to a signal applied to said first terminal an output signal on each of said third and fourth terminals having one-half of the power of said signal applied to said first terminal with said signal on said third terminal being shifted 90° in phase relative to the signal on said fourth terminal and responsive to a signal applied to said second terminal on output signal on each of said third and fourth terminals having half the power of said signal applied to said second terminal with the signal on said fourth terminal being shifted 90° in phase relative to the signal on said third terminal, means connecting said first input terminal to the second terminal of said first hybrid circuit, means for connecting an absorbing load to the first terminal of said first hybrid circuit, means for connecting the third terminal of said first hybrid circuit to the second terminal of said second hybrid circuit, means connecting absorbing loads to the first and third terminals of said second hybrid circuit, means connecting the fourth terminal of said second hybrid circuit to the first terminal of said third hybrid circuit, means connecting the fourth terminal of said first hybrid circuit to the first terminal of a fourth hybrid circuit, means connecting absorbing load to the second and third terminals of said fourth hybrid circuit, means connecting the fourth terminal of said fourth hybrid circuit to the first terminal of a fifth hybrid circuit, means connecting said second input terminal to the first terminal of a sixth hybrid circuit, means connecting and absorbing load to the second terminal of said sixth hybrid circuit, means connecting the third terminal of said sixth hybrid circuit to the second terminal of said fourth hybrid circuit, means connecting the fourth terminal of said sixth hybrid circuit to the second terminal of said fifth hybrid circuit, a first, second, third, and fourth square law detecting circuit, means connecting the third terminal of said third hybrid circuit to said first square law detecting circuit input, means connecting the fourth terminal of said third hybrid circuit to the second square law detecting circuit input, means connecting the third terminal of said fifth hybrid circuit to the third square law detecting circuit input, means connecting the fourth terminal of said fifth hybrid circuit to the fourth square law detecting circuit input, first means for subtracting the output of said first and second square law detecting circuits from one another, second means for subtracting the outputs of said third and fourth square law detecting circuits from one another, and means for utilizing the outputs of said first and second means for subtracting for indicating the relative properties of said first and second signals.

11. A network for determining the relative properties of a first and a second signal comprising a first and a second input terminal to which said respective first and second signals are applied, first, second, and third hybrid couplers, each of said hybrid couplers having first and second input terminals, first and fourth output terminals, and means intercoupling said input and output terminals for providing responsive to a signal applied to said first terminal an output signal on each of said third and fourth terminals having one-half of the power of said signal applied to said first terminal with said signal on said third terminal being shifted 90° in phase relative to the signal on said fourth terminal and responsive to a signal applied to said second terminal an output signal on each of said third and fourth terminals having half the power of said signal applied to said second terminal with the signal on said fourth terminal being shifted 90° in phase relative to the signal on said third terminal, means connecting said second input terminal to the first terminal of said first hybrid coupler, an absorbing load connected to the second terminal of said first hybrid coupler, means connecting the third terminal of said first hybrid coupler to the second terminal of said second hybrid coupler, means connecting the fourth terminal of said first hybrid coupler to the second terminal of said third hybrid coupler, a ring hybrid coupler, said ring hybrid coupler having first, second, third, and fourth input terminals and means for coupling said terminals for producing in response to a signal on its first terminal signals on said second and third terminals which are 180° out of phase and have half the power of the signal applied to said first terminal, means connecting said first input terminal to said first terminal of said ring hybrid coupler, means connecting the second terminal of said ring hybrid coupler to the first terminal of said hybrid coupler, means connecting the third terminal of said ring hybrid coupler to the first terminal of said third hybrid coupler, an absorbing load connected to the fourth terminal of said ring hybrid coupler, first, second, third, and fourth square law detecting circuits, means connecting the third terminal of said second hybrid coupler to the first square law detecting circuit input, means connecting the fourth terminal of said second hybrid coupling circuit to the second square law detecting circuit input, means connecting the third terminal of said third hybrid coupler to the third square law detecting circuit input, means connecting the fourth terminal of said third hybrid coupler to the fourth square law detecting circuit input, first means for subtracting the output of said first square law detecting circuit from the output of said second square law detecting circuit, second means for subtracting the output of said third square law detecting circuit from the output of said fourth square law detecting circuit, and means for utilizing the outputs of said first and second means for subtracting for indicating the relative properties of said first and second signals.

References Cited

UNITED STATES PATENTS

| | | | |
|---|---|---|---|
| 2,576,818 | 11/1951 | Waynick | 324—88 |
| 2,642,473 | 6/1953 | Kreer | 324—88 X |
| 2,708,718 | 5/1955 | Weiss | 328—140 X |
| 2,970,258 | 1/1961 | Sinclair | 324—57 |
| 3,061,780 | 10/1962 | Watts | 324—84 |
| 3,083,336 | 3/1963 | Poirier | 324—88 X |
| 3,135,917 | 6/1964 | Best et al. | 324—84 X |

RUDOLPH V. ROLINEC, *Primary Examiner.*

P. E. WILLE, *Assistant Examiner.*